United States Patent
Zembutsu et al.

(10) Patent No.: US 12,151,897 B2
(45) Date of Patent: Nov. 26, 2024

(54) PALLET CONVEYING DEVICE AND PALLET CONVEYING METHOD

(71) Applicant: NITTOKU Co., Ltd., Saitama (JP)

(72) Inventors: Hiroyuki Zembutsu, Saitama (JP); Yoshitaka Uchida, Fukushima (JP)

(73) Assignee: NITTOKU CO., LTD., Saitama (JP)

( * ) Notice: Subject to any disclaimer, the term of this patent is extended or adjusted under 35 U.S.C. 154(b) by 0 days.

(21) Appl. No.: 18/247,546

(22) PCT Filed: Jun. 21, 2022

(86) PCT No.: PCT/JP2022/024695
§ 371 (c)(1),
(2) Date: Mar. 31, 2023

(87) PCT Pub. No.: WO2023/007990
PCT Pub. Date: Feb. 2, 2023

(65) Prior Publication Data
US 2023/0373723 A1   Nov. 23, 2023

(30) Foreign Application Priority Data

Jul. 26, 2021  (JP) .................. 2021-121264

(51) Int. Cl.
*B65G 47/88* (2006.01)
*B65G 15/22* (2006.01)
*B65G 35/06* (2006.01)

(52) U.S. Cl.
CPC ............. *B65G 15/22* (2013.01); *B65G 47/88* (2013.01); *B65G 2201/0267* (2013.01); *B65G 2203/0291* (2013.01); *B65G 2205/00* (2013.01)

(58) Field of Classification Search
CPC ........ B65G 15/22; B65G 35/06; B65G 47/88; B65G 47/8815; B65G 2201/0267
USPC ................................. 198/577, 817
See application file for complete search history.

(56) References Cited

U.S. PATENT DOCUMENTS

| | | | | |
|---|---|---|---|---|
| 4,807,739 A * | 2/1989 | Wolf | ................. | B65G 47/2445 198/572 |
| 7,588,139 B1 * | 9/2009 | Campbell, III | ........ | B65G 21/14 198/606 |
| 8,695,782 B2 * | 4/2014 | Veldkamp | .............. | B65G 43/08 198/460.1 |
| 10,384,879 B2 * | 8/2019 | German | ................. | B65G 15/62 |
| 10,494,188 B2 * | 12/2019 | Zembutsu | ............. | B65G 47/52 |
| 10,661,998 B2 * | 5/2020 | Pauditz | ................. | B65G 43/10 |

FOREIGN PATENT DOCUMENTS

JP   2002-080114 A   3/2002

* cited by examiner

Primary Examiner — Douglas A Hess
(74) Attorney, Agent, or Firm — Rabin & Berdo, P.C.

(57) ABSTRACT

A pallet conveying device includes a circulating belt provided to extend along a conveying path so as to be capable of being circulated, the circulating belt being configured to convey a pallet, a driving mechanism configured to circulate the circulating belt, and a stopper mechanism configured to stop conveying of the pallet regardless of the circulation of the circulating belt. The circulating belt has a free flow belt capable of stopping the conveying of the pallet by the stopper mechanism, and a conveying belt provided continuously to the free flow belt. A circulating speed of the conveying belt is different from a circulating speed of the free flow belt.

8 Claims, 9 Drawing Sheets

PALLET CONVEYING DEVICE AND PALLET CONVEYING METHOD

TECHNICAL FIELD

The present invention relates to a pallet conveying device and a pallet conveying method for conveying a pallet carrying a workpiece.

BACKGROUND ART

As conventional production lines, those in which a free flow conveyor is provided so as to link a plurality of machine tools, the pallet carrying the workpiece is conveyed by the free flow conveyor, and a predetermined processing is performed on the workpiece carried by the pallet by using the machine tool after being conveyed are known.

It is proposed to provide, as such a device for conveying the pallet carrying the workpiece, a constant pitch conveyor having pallet feeding hooks that is provided in parallel with the free flow conveyors for conveying the pallet, that is driven by a servo mechanism, and that is moved in the same direction as the moving direction of the free flow conveyors (for example, JP2002-80114A).

With the pallet conveying device as described above, by increasing and decreasing a feed speed of the constant pitch conveyor, it is possible to realize an anti-bounce stop by avoiding an impact caused to the pallet and/or a part when the conveyor is stopped even in a case in which the speed of the free flow conveyor is high.

SUMMARY OF INVENTION

Because the pallet conveying device for conveying the pallet carrying the workpiece is generally provided to link the machine tools for performing a predetermined processing to the workpiece, when the pallet faces the machine tool, in order to subject the workpiece to the processing, the conveying of the pallet carrying the workpiece is stopped or the conveying speed is reduced considerably.

On the other hand, a plurality of pallets each carrying the workpiece are provided, and they are conveyed in succession. In the above-described conventional pallet conveying device including the constant pitch conveyor, intervals between the pallets are maintained constant. Therefore, even when the workpiece is being processed, the pallets are mounted on the free flow conveyor that is provided across the machine tools so as to link them, and so, as the number of pallet required is increased, a time period between a processing performed at a certain machine tool and a processing performed at the next machine tool becomes longer.

An object of the present invention is to provide a pallet conveying device and a pallet conveying method capable of reducing the number of pallets required.

According to one aspect of the present invention, a pallet conveying device includes: a circulating belt provided to extend along a conveying path so as to be capable of being circulated, the circulating belt being configured to convey a pallet; a driving mechanism configured to circulate the circulating belt; and a stopper mechanism configured to stop conveying of the pallet regardless of the circulation of the circulating belt, wherein the circulating belt has a free flow belt capable of stopping the conveying of the pallet by the stopper mechanism; and a conveying belt provided continuously to the free flow belt, and a circulating speed of the conveying belt is different from a circulating speed of the free flow belt.

Further, according to another aspect of the present invention, a pallet conveying method for conveying a pallet by using a pallet conveying device, the pallet conveying method includes a step of increasing a conveying speed of the pallet conveyed by a conveying belt so as to be higher than a conveying speed of the pallet conveyed by a free flow belt by increasing a circulating speed of the conveying belt so as to be higher than a circulating speed of the free flow belt.

DESCRIPTION OF EMBODIMENTS

In the following, an embodiment of the present invention will be described with reference to the drawings.

FIGS. 1 to 4 show a pallet conveying device 10 according to the embodiment of the present invention. In the respective figures, three axes, X, Y, and Z, that mutually orthogonal are set. The configuration of the pallet conveying device 10 will be described by stating that the X axis extends in the substantially horizontal transverse direction, the Y axis extends in the substantially horizontal front-rear direction, and the Z axis extends in the vertical direction.

Figure 1:
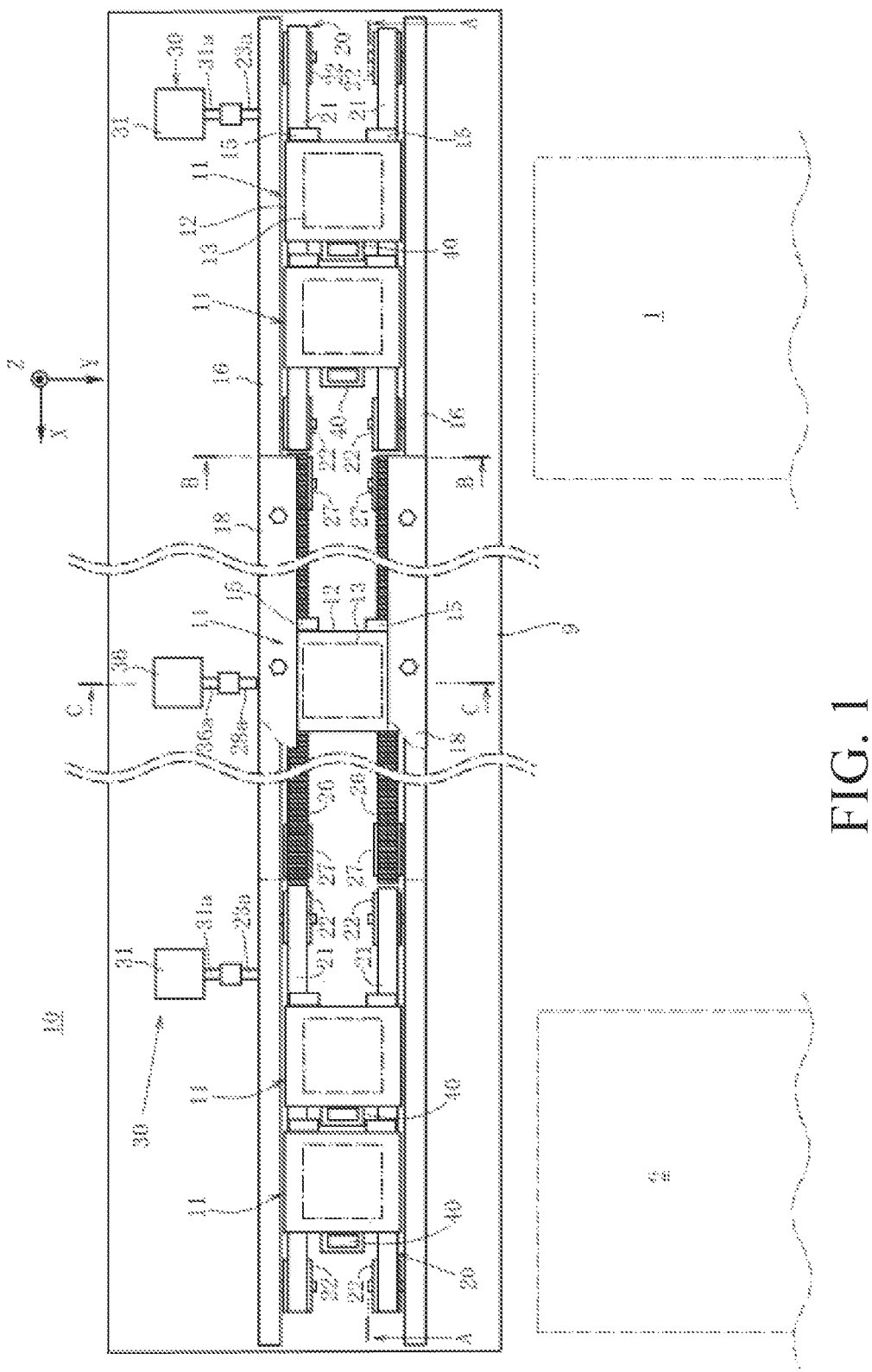
FIG. 1 is a plan view showing a pallet conveying device of an embodiment of the present invention.
Figure 2:
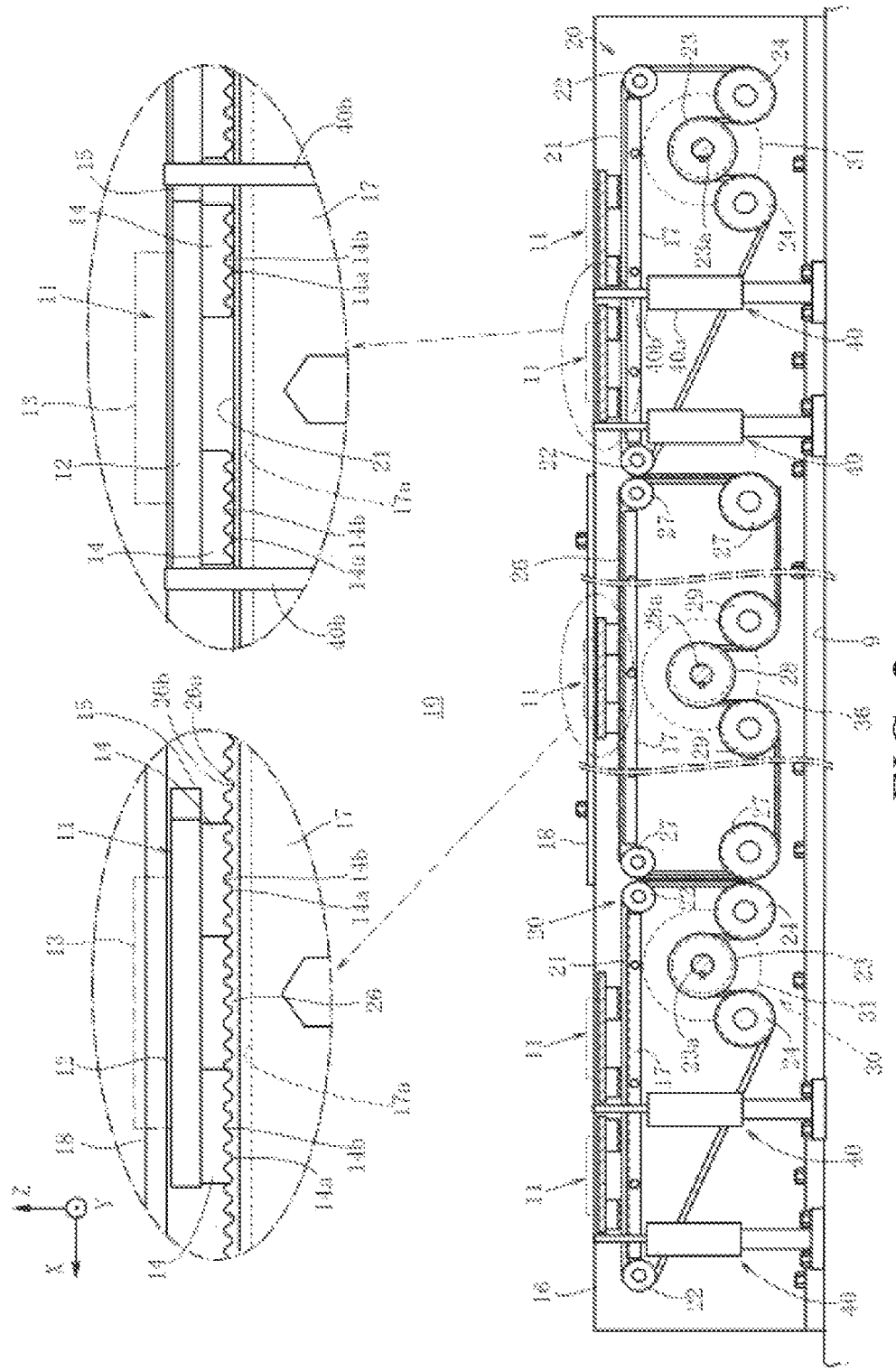
FIG. 2 is a sectional view taken along line A-A shown in FIG. 1.

As shown in FIGS. 1 and 2, the pallet conveying device 10 includes: a circulating belt 20 that are provided to extend along a conveying path so as to be capable of being circulated, and the circulating belt 20 being configured to convey pallets 11; driving mechanisms 30 serving as driving means that circulate the circulating belt 20; and stopper mechanisms 40 serving as stopper means that stop the conveying of the pallets 11 regardless of the circulation of the circulating belt 20.

The pallet conveying device 10 conveys the pallets 11 each carrying a workpiece (not shown) on the circulating belt 20, stops the conveying of the pallets 11 by the stopper mechanisms 40 in front of respective machine tools 1 and 2 (see FIG. 1) that are provided along the conveying path, and processes the workpiece carried on the pallet 11 by each of the machine tools 1 and 2.

Although FIG. 1 shows a case in which two machine tools 1 and 2 are provided on one side of the pallet conveying device 10, this is only an example, and the number of machine tools 1 and 2 may be different in accordance with a kind of the workpiece subjected to the processing. The number of pallet 11 may be appropriately increased or decreased in accordance with the number of machine tools.

In this embodiment, a platform 9 is provided to extend so as to link the plurality of machine tools 1 and 2, and on the platform 9, a pair of support plates 16 extending along the conveying path of the pallet 11 (the X axis direction) are fixed in parallel with each other with a predetermined gap therebetween in the width direction (the Y axis direction).

The circulating belts 20 of the pallet conveying device 10 are respectively provided on opposing sides of the pair of support plates 16. The circulating belts 20 support both side portions of the pallets 11 in the width direction. The pallet 11 are configured such that they can be mounted on the pair of circulating belts 20.

As shown in an enlarged view in FIG. 2, the pallets 11 in this embodiment each has: a base mount 12 that has a square shape when viewed in a planar view and that is supported by the circulating belts 20 on its both side portions; a mounting tool 13 that is provided on an upper surface of the base mount 12 and on which the workpiece to be processed by the machine tools 1 and 2 is mounted; and contact members 14 that are provided on a lower surface of the base mount 12 and that respectively come into direct contact with the circulating belts 20.

The mounting tool 13 may have a different shape depending on the kind of the workpiece to be conveyed. In order to successively convey the plurality of workpieces, a plurality of pallets 11, each of which is provided with the mounting tool 13, are prepared. On a rear end portion of the base mount 12 in the conveying direction, a cushioning material 15 coming into contact with a front end portion of the succeeding pallet 11 is provided.

Figure 3:
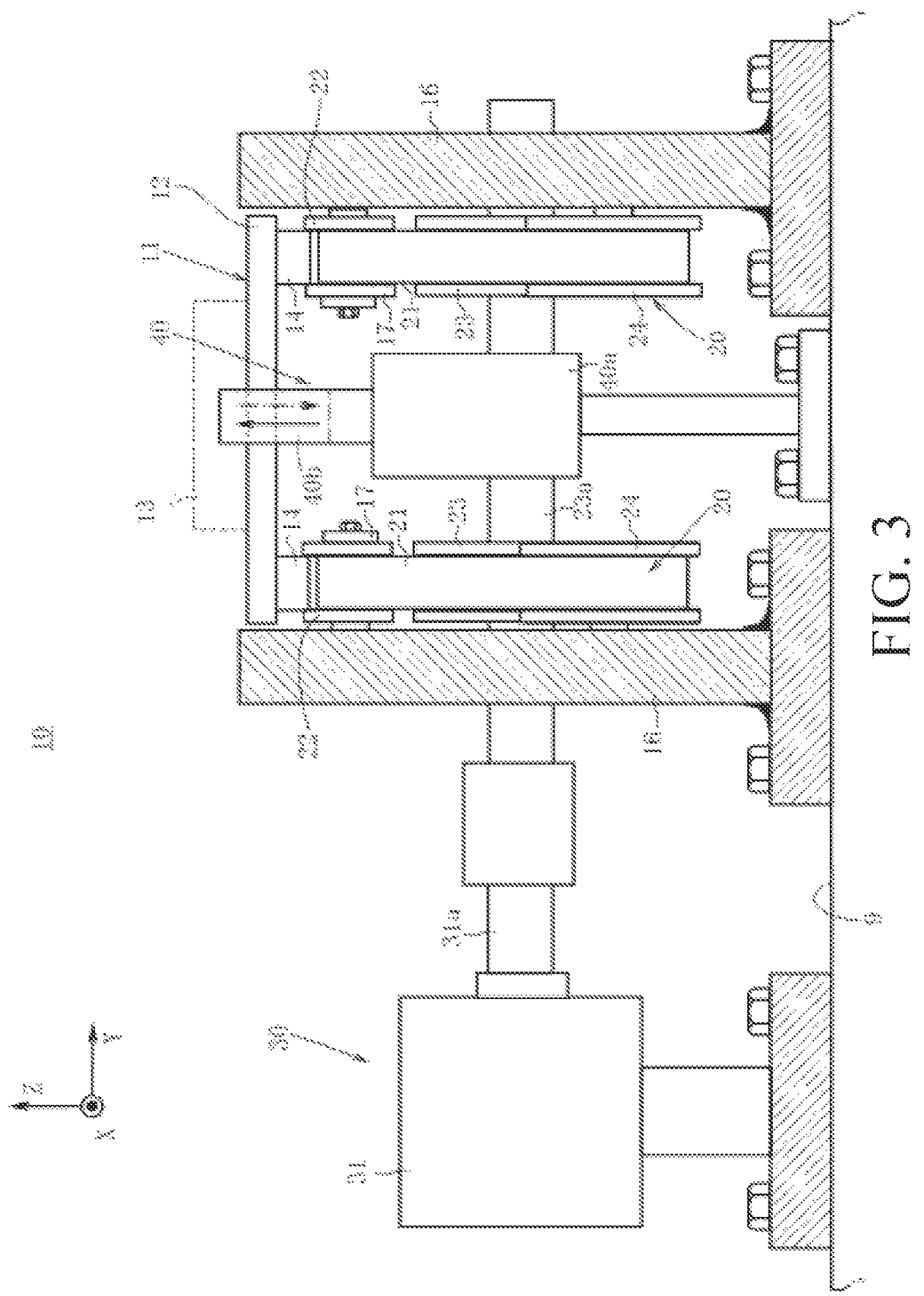
FIG. 3 is a sectional view taken along line B-B shown in FIG. 1.
Figure 4:
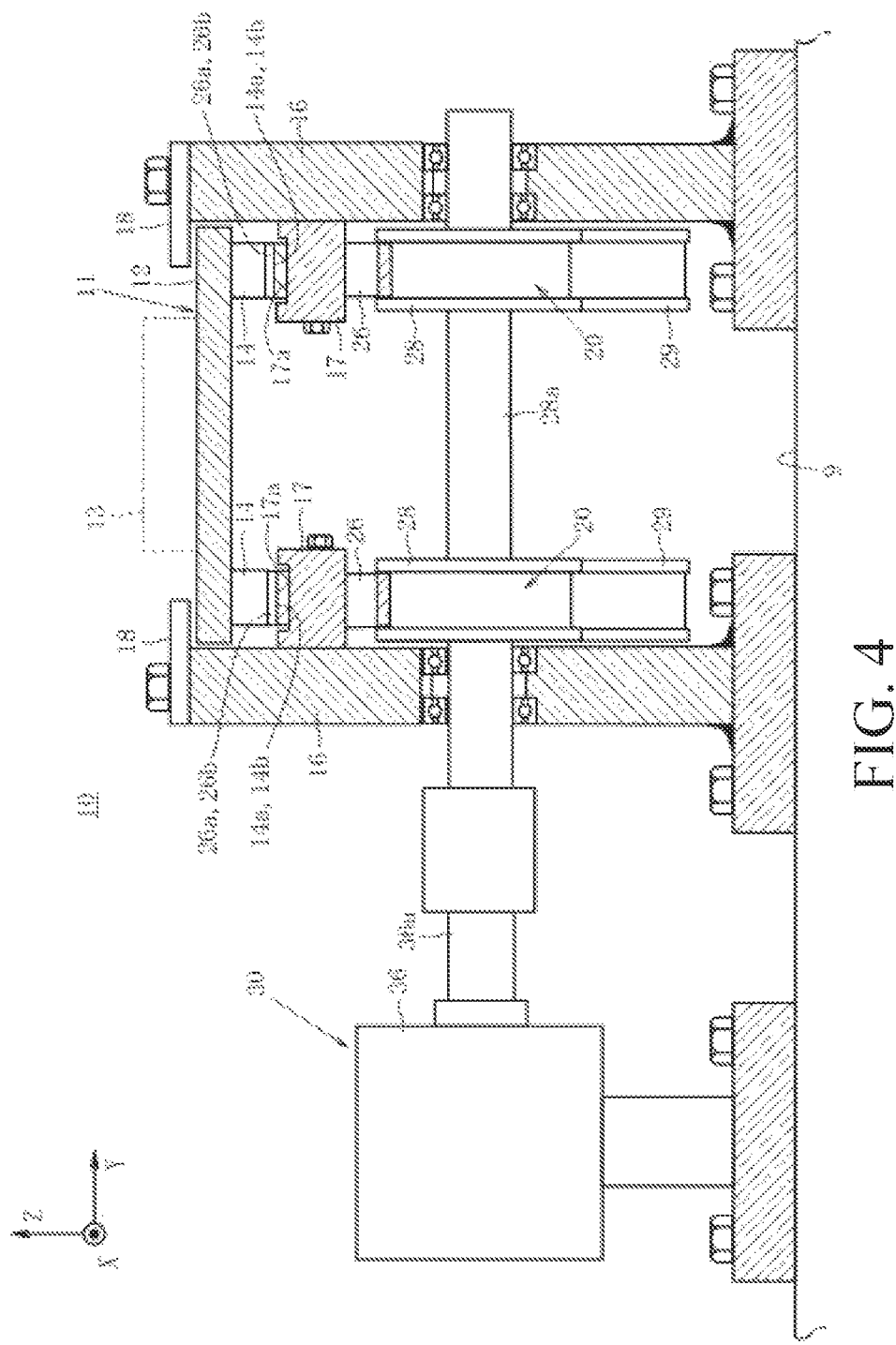
FIG. 4 is a sectional view taken along line C-C shown in FIG. 1.

As shown in FIGS. 3 and 4, in a state in which both side portions of the pallet 11 in the width direction are respectively supported by the circulating belts 20, the pair of support plates 16 are configured such that the pallets 11 are positioned between the support plates 16 in the width direction with a predetermined gaps and such that displacement of the pallets 11 in the width direction is prevented without obstructing the conveying of the pallets 11.

Returning to FIGS. 1 and 2, the circulating belts 20 each has free flow belts 21 capable of stopping the conveying of the pallets 11 by the stopper mechanism 40, and conveying belts 26 that are provided continuously to the free flow belts 21 and that are not provided with the stopper mechanism 40. With the driving mechanisms 30, different circulating speeds are achieved for the conveying belts 26 and the free flow belts 21.

The free flow belts 21 are respectively provided at positions opposing to the machine tools 1 and 2 and are each configured such that the conveying of the pallets 11 can be stopped by the stopper mechanism 40. On the other hand, the conveying belts 26 are provided at the position where there is no need to stop the conveying of the pallets 11.

Because the circulating belts 20 respectively provided on the mutually opposing sides of the pair of support plates 16 and 16 have a symmetrical structure, the circulating belt 20 that is provided on the support plate 16 on one side will be described as a representative. As shown in FIG. 2, on the support plate 16, driven pulleys 22, around which the free flow belt 21 is suspended, are provided at a part facing the machine tool 1 or 2. And, on the support plate 16, driven pulleys 27, around which the conveying belt 26 is suspended, are provided at a portion not facing the machine tools 1 and 2.

The free flow belts 21 and the conveying belts 26 respectively surround the driven pulleys 22, 27 such that their upper surfaces are continuous with each other in the horizontal direction.

On the pair of support plates 16, a driving shaft 23a is provided at a part where the free flow belts 21 are provided, and a driving pulley 23 is attached to the driving shaft 23a. In addition, on the pair of support plates 16, a driving shaft 28a is provided at a part where the conveying belts 26 are provided, and a driving pulley 28 is attached to the driving shaft 28a. The driving pulley 23 and the driving pulley 28 have the same shape and the same size.

A first motor 31 serving as the driving mechanism 30 for circulating the free flow belts 21 is provided on the platform 9, and a second motor 36 serving as the driving mechanism 30 for circulating the conveying belts 26 is provided on the platform 9. The driving shafts 23a and 28a are respectively linked to rotation shafts 31a and 36a of the first and second motors 31 and 36 (see FIGS. 3 and 4).

On each of the mutually opposing sides of the pair of support plates 16 and 16, the driving pulley 23 and the driven pulleys 22 are provided in the same plane, and the driving pulley 28 and the driven pulleys 27 are provided in the same plane. In addition, in the vicinity of the driving pulley 23 on the support plate 16, a pair of directing pulleys 24 for directing the free flow belt 21 are provided such that the free flow belt 21 is suspended around the driving pulley 23. In the vicinity of the driving pulley 28 on the support plate 16, a pair of directing pulleys 29 for directing the conveying belt 26 are provided such that the conveying belt 26 is suspended around the driving pulley 28.

The pair of support plates 16 and 16 are respectively provided with support members 17 that support upper parts of the free flow belts 21 and the conveying belts 26 to prevent occurrence of a slack for the free flow belts 21 and the conveying belts 26. The support members 17 are respectively provided on the support plates 16 by being screwed. In this embodiment, the support members 17 are each formed with a groove 17a that receives the upper part of the free flow belt 21 or the conveying belt 26 to prevent movement of the free flow belt 21 or the conveying belt 26 in the width direction (see FIG. 4).

As the first and second motors 31 and 36 are driven by an instruction from a controller (not shown), the driving pulleys 23 and 28 are rotated at the same time, and the free flow belts 21 and the conveying belts 26 that are respectively suspended around the driving pulleys 23 and 28 are circulated in the same direction in a state in which they are respectively surrounding the driven pulleys 22 and 27.

In FIGS. 1 and 2, a plurality of sets of the free flow belts 21 are provided such that a single set of the conveying belts 26 is interposed therebetween. In this embodiment, the pallet conveying device 10 includes upstream side free flow belts 21 that are provided so as to oppose to the machine tool 1 provided on the upstream side, the conveying belts 26 provided continuously to these free flow belts 21, and downstream side free flow belts 21 that are provided continuously to the conveying belts 26 and that are provided so as to oppose to the machine tool 2 provided on the downstream side.

As described above, the conveying belts 26 are respectively arranged between the free flow belts 21 that are respectively provided so as to oppose to the machine tools 1 and 2, and the conveying belts 26 are provided so as to respectively link the two sets of free flow belts 21.

As the first and second motors 31 and 36 are driven to circulate the free flow belts 21 and the conveying belts 26 on which the pallets 11 are mounted, the pallets 11 are moved while being mounted on the free flow belts 21 and the conveying belts 26. Specifically, the pallet 11 that has been moved by being mounted on the upstream side free flow belts 21 is further moved after being transferred from end portions of the free flow belts 21 to the conveying belts 26 and mounted on the conveying belts 26. The pallet 11 is further moved after being transferred from end portions of the conveying belts 26 to the downstream side free flow belts 21 and mounted on the downstream side free flow belts 21. As described above, the pallet 11 is conveyed by the free flow belts 21 and the conveying belts 26.

The free flow belts 21 that support both side portions of the pallet 11 in the width direction are each formed to have a flat outer surface serving as a mounting surface for the pallet 11, and in a state in which the conveying of the pallet 11 is stopped by the stopper mechanism 40, the pallet 11 slides on the outer surface of the free flow belt 21. The stopper mechanisms 40 are each provided between the pair of free flow belts 21 supporting both side portions of the pallet 11 in the width direction, thereby prohibiting the movement of the pallet 11 regardless of the circulation of the free flow belts 21 serving as the circulating belts 20.

In this embodiment, as shown in FIG. 3, the stopper mechanism 40 is a fluid pressure cylinder. The fluid pressure cylinder 40 has a main body portion 40a attached to the platform 9 and a rod 40b that is provided on the main body portion 40a so as to be freely moved back and forth and is moved in the vertical direction. As shown by a solid line in the figure, when the fluid pressure cylinder 40 is extended and the rod 40b is moved upward, the front end portion of the pallet 11, which is mounted on and moved with the circulating free flow belts 21, comes into contact with the rod 40b, and the pallet 11 slides relative to the outer surfaces of the free flow belts 21 and the conveying of the pallet 11 is stopped regardless of the circulation of the free flow belts 2. On the other hand, as shown by a one-dot chain line in the figure, in a state in which the fluid pressure cylinder 40 is contracted and the rod 40b is moved downward, the fluid pressure cylinder 40 allows the movement of the pallet 11 that is mounted on the circulating free flow belts 21.

As shown in FIGS. 1 and 2, in this embodiment, for both of the upstream side free flow belts 21 and the downstream side free flow belts 21, for processing the workpiece by the machine tools 1 and 2 (see FIG. 1), the fluid pressure cylinders 40 are respectively provided at processing points, at each of which the conveying of the pallet 11 carrying the workpiece to be processed is stopped, and at standby points, at each of which the pallet 11 moving towards the processing point is stopped temporarily in a vicinity of the upstream side of the processing point. As described above, the fluid pressure cylinders 40 each serving as the stopper mechanism are provided in a manner corresponding to the processing point at which the conveying of the pallets 11 is stopped and to the standby point at which the pallet 11 is temporarily stopped in the vicinity of the processing point. In addition, the fluid pressure cylinders 40 are provided between the pair of support plates 16.

On the other hand, as shown in an enlarged view in FIG. 2, the conveying belts 26 that are provided between the upstream side free flow belts 21 and the downstream side free flow belts 21 so as to link these belts are each a so-called toothed belt 26 that has an outer surface, which is the mounting surface for the pallet 11, on which engaging-protrusions and engaging-recesses 26a and 26b extending in the width direction are formed alternately in the longitudinal direction in a continuous manner.

In addition, the contact members 14 provided on the base mount 12 of the pallet 11 are respectively formed with engaged-protrusions and engaged-recesses 14a and 14b that can engage with the engaging-protrusions and engaging-recesses 26a and 26b of the circulating belt. In other words, the engaged-protrusions and engaged-recesses 14a and 14b on the contact members 14 are configured to have the same shapes and the same sizes as those of the engaging-protrusions and engaging-recesses 26a and 26b in the cross-section so as to engage with the engaging-protrusions and engaging-recesses 26a and 26b of the conveying belts 26. When the pallet 11 is mounted on the conveying belts 26 and the contact members 14 are overlayed on the conveying belts 26, the engaged-protrusions and engaged-recesses 14a and 14b formed on the contact members 14 respectively engage with the engaging-protrusions and engaging-recesses 26a and 26b formed on the conveying belts 26, and thereby, the movement of the pallet 11 relative to the conveying belts 26 in the X axis direction is prohibited.

In order to maintain a state in which the pallet 11 is engaged with the conveying belts 26, the pallet conveying device 10 is provided with retaining members 18 that prevent the pallet 11 mounted on the conveying belts 26 from floating from the conveying belts 26. In this embodiment, the retaining members 18 are flat plates respectively attached on upper surfaces of the pair of support plates 16 that are provided so as to sandwich the pallet 11 from both sides in the width direction. The retaining members 18 are provided so as to cover side portions of the base mount 12 of the pallet 11 from the above, thereby preventing the floating of the pallet 11 from the conveying belts 26 by coming into contact with the pallet 11.

Next, a pallet conveying method using the pallet conveying device 10 will be described.

The pallet conveying method according to this embodiment is a method to move the plurality of pallets 11 each carrying the workpiece to be processed by using the pallet conveying device 10. Specifically, in this method, the pallets 11 are mounted on the circulating belts 20, and the circulating belts 20 are circulated in this state to convey the pallets 11 mounted on the circulating belts 20.

Because the circulating belts 20 of the pallet conveying device 10 have the free flow belts 21 and the conveying belts 26 that are provided continuously to the free flow belts 21, by circulating both in the same direction and by mounting the pallets 11 on the circulating belts 20, the pallets 11 are conveyed in the same direction.

The circulation of the circulating belts 20 is performed by the driving mechanisms 30. The first and second motors 31 and 36 serving as the driving mechanisms are driven to rotate the driving pulleys 23 and 28 at the same time, and thereby, the free flow belts 21 and the conveying belts 26 respectively suspended around the driving pulleys 23 and 28 are circulated in the same direction.

In this embodiment, the pallet 11 carrying the workpiece is conveyed by being mounted on the circulating belts 20, the conveying of the pallet 11 is stopped by the stopper mechanisms 40 in front of the machine tools 1 and 2 (see FIG. 1) that are provided along the conveying path, and the workpiece carried on the pallet 11 is processed by the machine tools 1 and 2. The method will be described specifically below.

Figure 5:
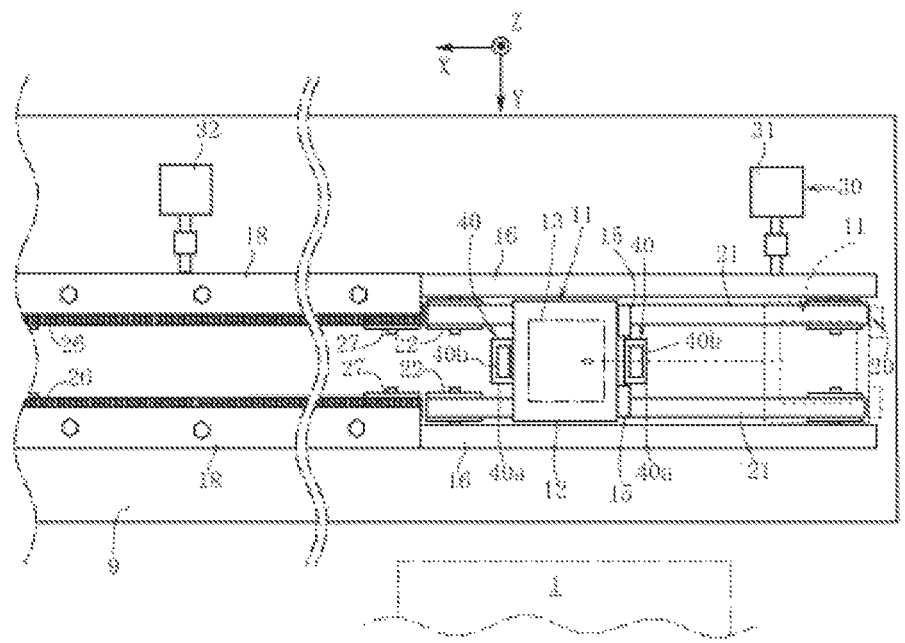
FIG. 5 is a plan view of the pallet conveying device showing a state in which a pallet mounted on free flow belts is stopped at a processing point opposing to a first machine tool.
Figure 6:
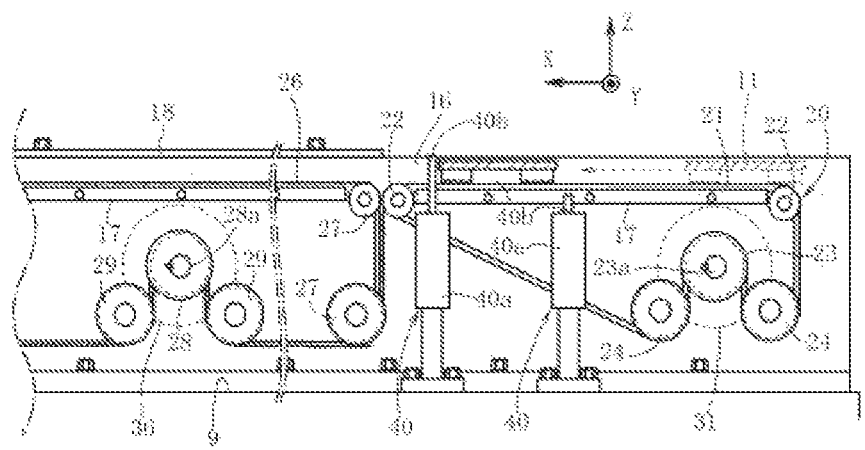
FIG. 6 is a front view of the pallet conveying device corresponding to FIG. 5.

The workpiece is placed on the mounting tool 13 of the pallet 11, and the pallet 11 carrying the workpiece is mounted on upstream side end portions of the circulating belts 20, in other words, as shown by a broken line in FIGS. 5 and 6, the pallet 11 is mounted on upstream side end portions of the upstream side free flow belts 21.

The pallet 11 that is mounted on the upstream side of the free flow belts 21 is moved and conveyed to the downstream side together with the free flow belts 21 due to a contact resistance (friction) with the outer surfaces of the circulating free flow belts 21. Next, when the pallet 11 reaches in front of the machine tool 1 that is provided so as to oppose to the upstream side free flow belts 21, the conveying of the pallet 11 is stopped by the stopper mechanism 40.

Specifically, as shown in FIG. 6, the fluid pressure cylinder 40, which is provided at the processing point at which the conveying of the pallet 11 is stopped for subjecting the workpiece to the processing performed by the machine tool 1, is extended, and a state in which the rod 40b is projected out from the outer surfaces of the free flow belts 21 is achieved. On the other hand, the fluid pressure cylinder 40, which is provided at the standby point on the upstream side of the processing point, is contracted, and a state in which the rod 40b is lowered below the outer surfaces of the free flow belts 21 is achieved.

In this state, as the pallet 11 is mounted on the upstream side of the free flow belts 21, the pallet 11 moving towards the downstream side passes through the standby point and reaches the processing point, and thereby, the pallet 11 comes into contact with the rod 40b of the fluid pressure cylinder 40 provided at the processing point. Thus, regardless of the circulation of the free flow belts 21, the pallet 11 slides on the outer surfaces of the free flow belts 21 and further movement thereof towards the downstream side is prohibited, and thereby, the conveying of the pallet 11 is stopped.

The circulating speed of the free flow belts 21 is set to an extent such that the workpiece carried on the pallet 11 does not jump up, move around, or jump out from the pallet 11 when the pallet 11 is stopped by the fluid pressure cylinder 40. During the movement of the pallet 11 is stopped at the processing point by the fluid pressure cylinder 40, the machine tool 1 performs the processing of the workpiece carried on the pallet 11.

Figure 7:
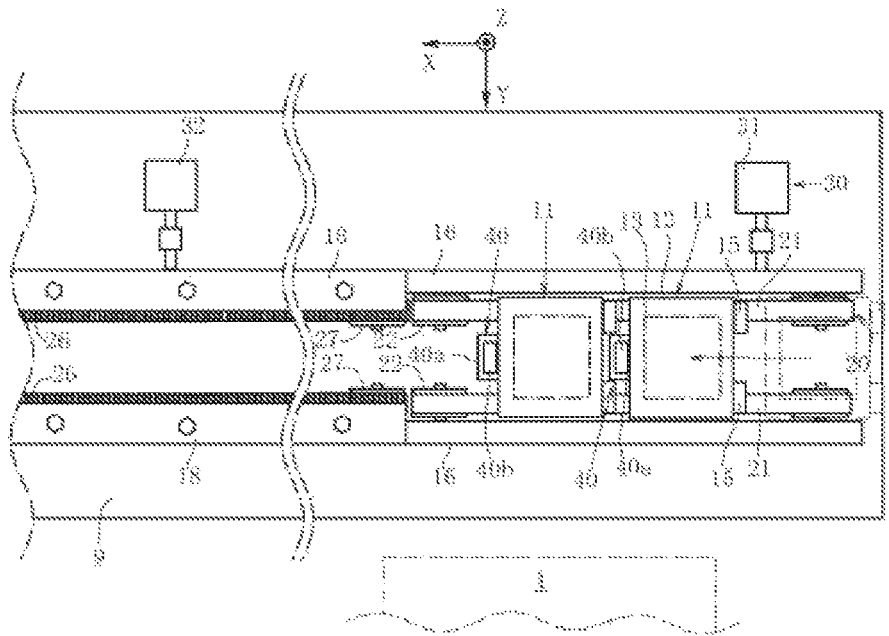
FIG. 7 is a plan view of the pallet conveying device showing a state in which another pallet mounted on the free flow belts is stopped at a standby point after the state shown in FIG. 5.
Figure 8:
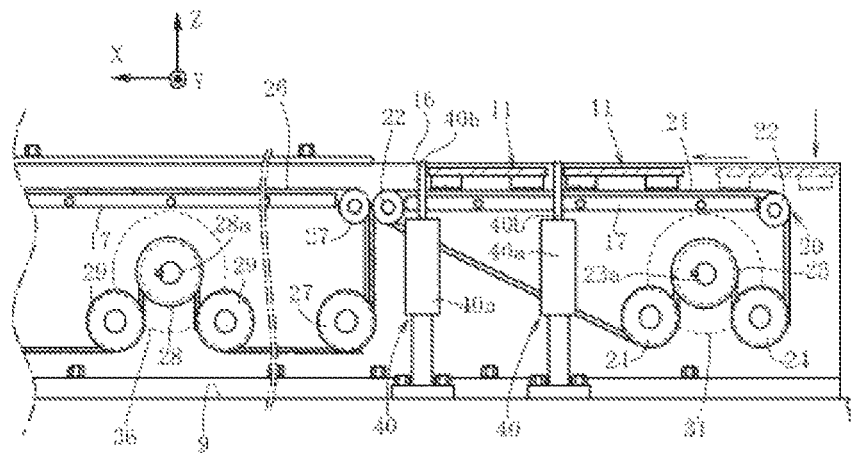
FIG. 8 is a front view of the pallet conveying device corresponding to FIG. 7.

In this embodiment, because the fluid pressure cylinder 40 is also provided at the standby point that is on the upstream side of the processing point, as shown in FIGS. 7 and 8, at the time when a preceding pallet 11 reaches the processing point, the fluid pressure cylinder 40 provided at the standby point is extended to achieve a state in which the rod 40b is projected out from the outer surfaces of the free flow belts 21. By doing so, during the processing of the workpiece carried on the pallet 11 stopped at the processing point, if another pallet 11 carrying the workpiece is mounted on the upstream side of the free flow belts 21, it is possible to allow the pallet 11 carrying the another workpiece to be stopped at the standby point in the vicinity of the processing point.

When the processing performed by the machine tool 1 on the workpiece carried on the pallet 11, which is stopped at the processing point, is finished, the fluid pressure cylinder 40 is contracted to release the state in which the pallet 11 is in contact with the rod 40b. By doing so, the pallet 11 carrying the workpiece that has been processed is moved again due to the friction with the free flow belts 21 and is conveyed towards the downstream side.

Figure 9:
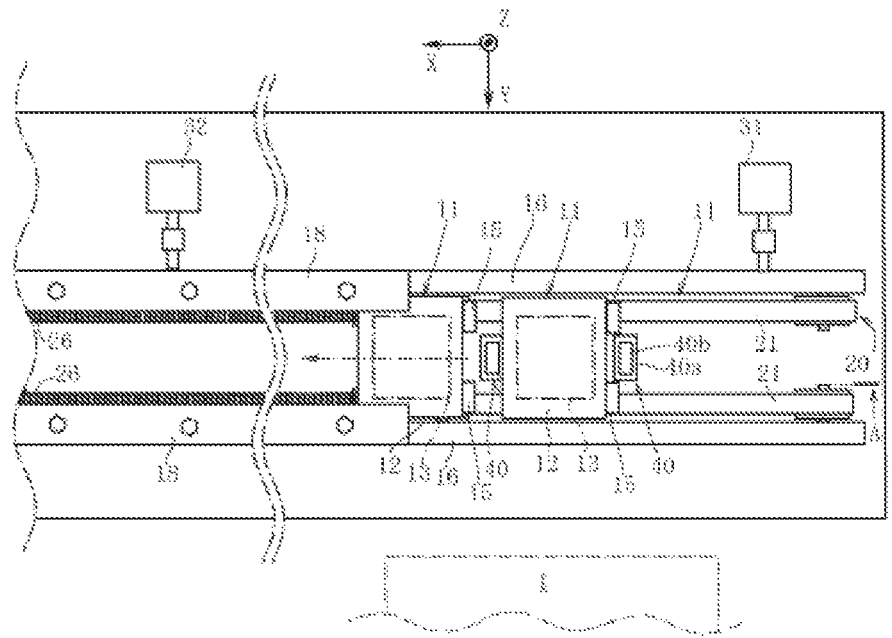
FIG. 9 is a plan view showing a state in which the pallet is transferred from end portions of the free flow belts to conveying belts.
Figure 10:
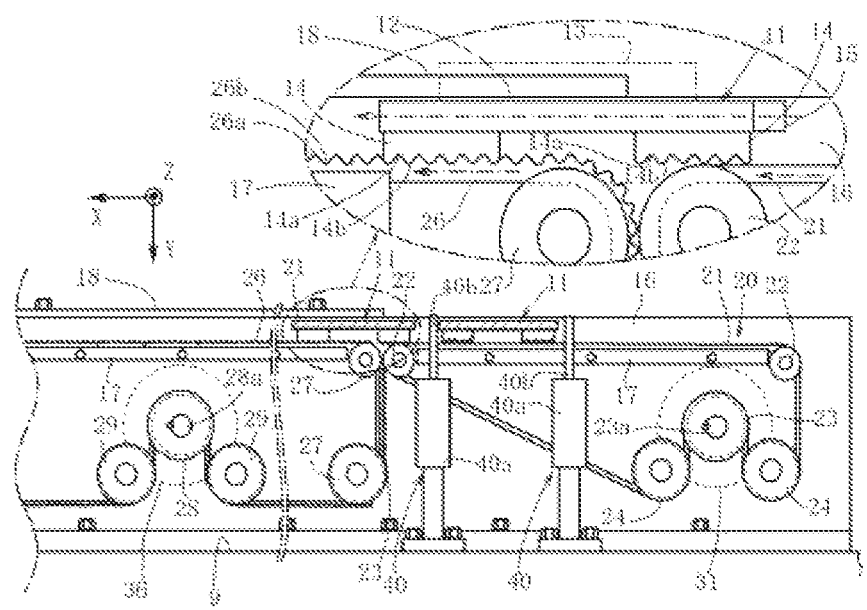
FIG. 10 is a front view of the pallet conveying device corresponding to FIG. 9.

In a case in which the pallet 11 is also stopped at the standby point on the upstream side of the processing point, as shown in FIGS. 9 and 10, at the same time as the stopped state is released by the fluid pressure cylinder 40 that is provided at the processing point, the stopped state is also released by the fluid pressure cylinder 40 that is provided at the standby point. Specifically, the fluid pressure cylinder 40 that is provided at the standby point is contracted to release the state in which the pallet 11 is in contact with the rod 40b. By doing so, the pallet 11 that is stopped at the standby point is moved to the processing point due to the friction with the free flow belts 21, and the fluid pressure cylinder 40 that is provided at the processing point is extended to stop further conveying of the pallet 11, and thereby, the processing by the machine tool 1 is started promptly.

When the stopped state is released by the fluid pressure cylinder 40, the pallet 11 carrying the workpiece that has been subjected to the processing is moved towards downstream side from the processing point, and when the pallet 11 reaches the downstream side end portions of the free flow belts 21, the pallet 11 is transferred to the conveying belts 26 that are provided continuously to the free flow belts 21.

When the pallet 11 is transferred to the conveying belts 26, the contact members 14 of the pallet 11 are overlayed on the conveying belts 26. Specifically, as shown in an enlarged view in FIG. 10, the engaged-protrusions and engaged-recesses 14a and 14b formed under the contact members 14 engage with the engaging-protrusions and engaging-recesses 26a and 26b formed on the conveying belts 26, and thereby, the movement of the pallet 11 in the X axis direction independent of the conveying belts 26 is prohibited. Therefore, the pallet 11 is conveyed towards the downstream side at the speed that is equal to the circulating speed of the conveying belts 26.

Figure 11:
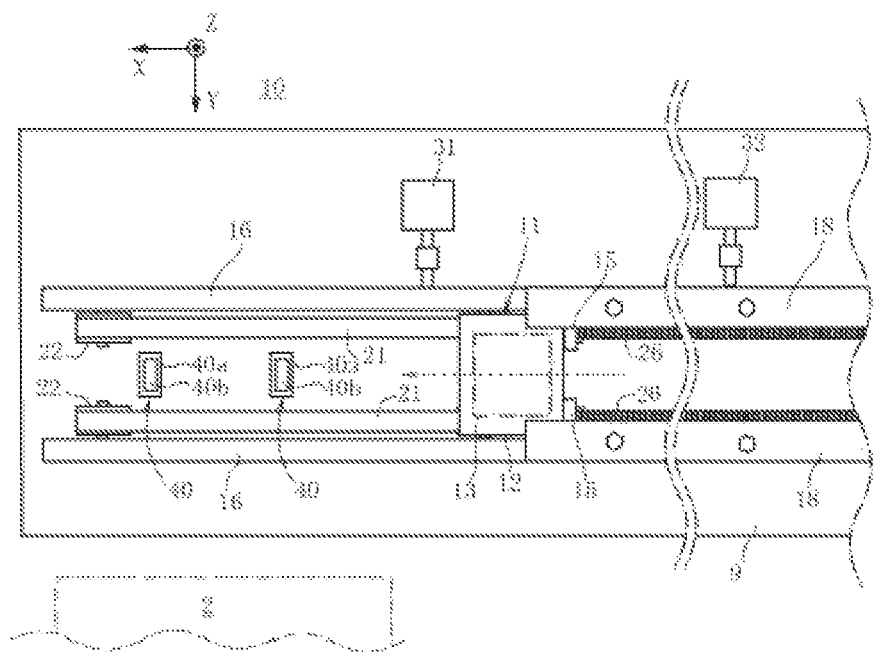
FIG. 11 is a plan view showing a state in which the pallet is transferred from end portions of the conveying belts to the free flow belts.
Figure 12:
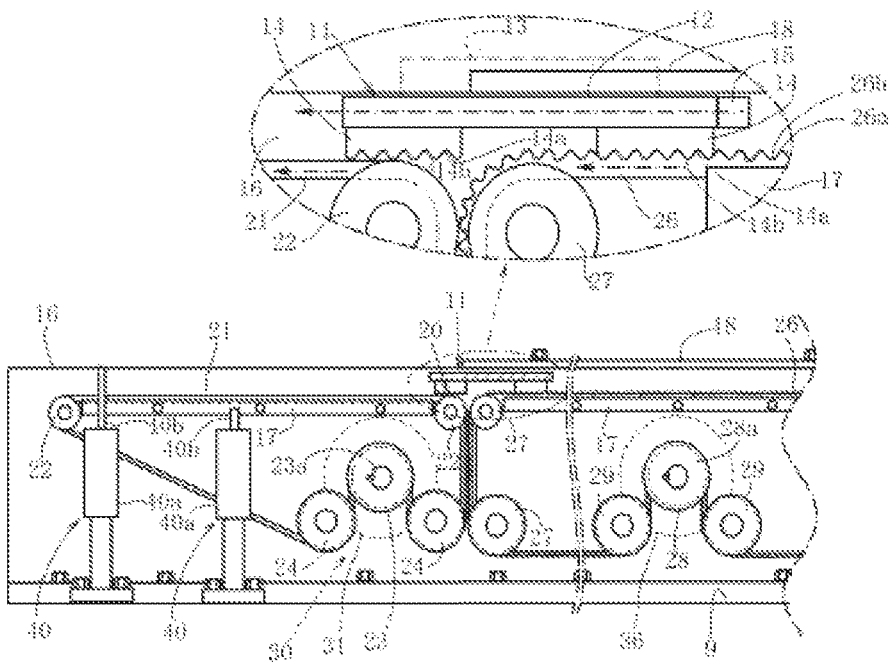
FIG. 12 is a front view of the pallet conveying device corresponding to FIG. 11.

When the pallet 11, which is mounted on the conveying belts 26 and conveyed towards the downstream side, reaches the end portions of the conveying belts 26 on the downstream side, as shown in FIGS. 11 and 12, the pallet 11 is further transferred to the downstream side free flow belts 21 that are provided continuously to the conveying belts 26.

Figure 13:
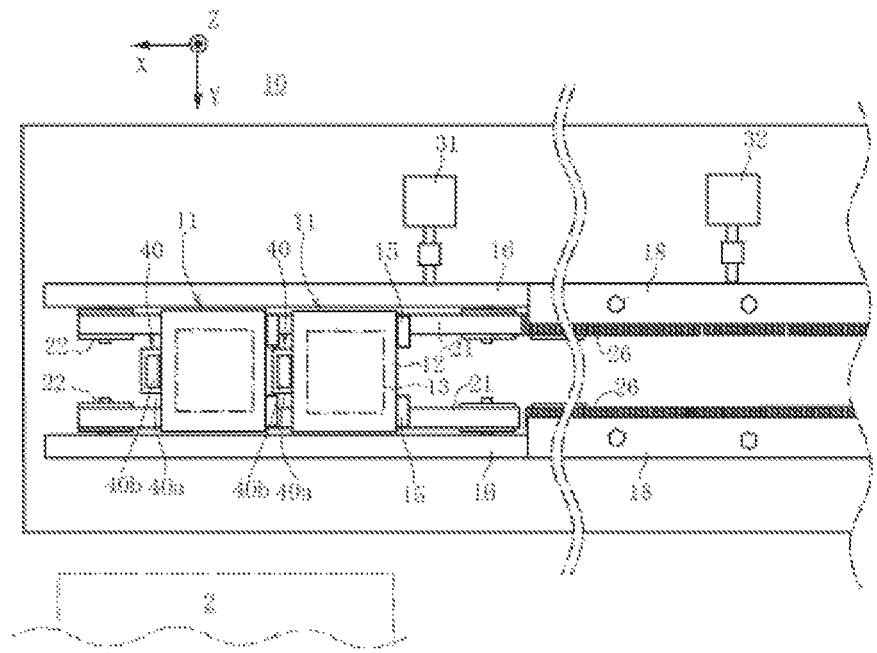
FIG. 13 is a plan view showing a state in which the pallets are stopped at both of the processing point opposing to the next machine tool and the standby point.
Figure 14:
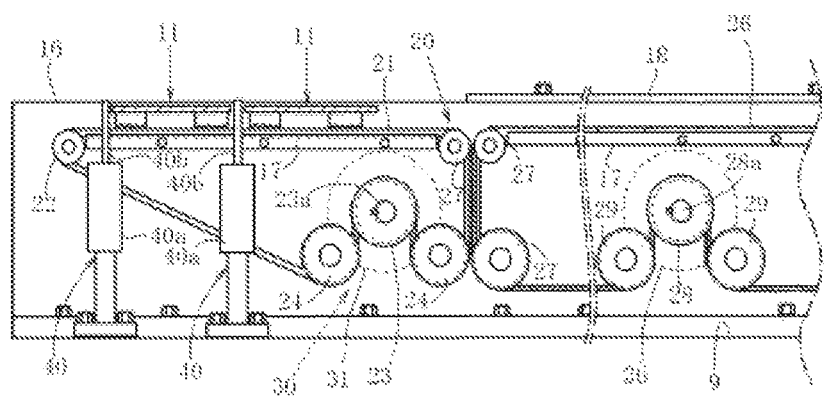
FIG. 14 is a front view of the pallet conveying device corresponding to FIG. 13.

As the downstream side free flow belts 21 are circulated, the pallet 11 is further conveyed towards the downstream side, and as shown in FIGS. 13 and 14, the pallet 11 then faces the machine tool 2 on the downstream side, which is provided corresponding to the downstream side free flow belts 21, and is stopped again so as to be subjected to the processing by the machine tool 2.

The conveying of the pallet 11 on the downstream side free flow belts 21 is stopped by the fluid pressure cylinder 40 that is provided for the downstream side free flow belts 21. Because the method for stopping the pallet 11 using the fluid pressure cylinder 40 is the same as the above-described method for the upstream side free flow belts 21, repeated description will be omitted. In a state in which the conveying of the pallet 11 is stopped, the machine tool 2 performs the processing to the workpiece carried on the pallet 11.

Because the stopper mechanism 40 is also provided at the standby point on the upstream side of the processing point for the downstream side free flow belts 21, during the processing by the machine tool 2 at the processing point, the pallet 11 carrying the workpiece for the subsequent processing may also be further conveyed and stopped at the standby point.

When the processing performed by the machine tool 2 on the downstream side is finished, the pallet 11 carrying the workpiece is conveyed again towards the downstream side. This conveying is started by contracting the fluid pressure cylinder 40 to release the stopped state of the pallet 11 by the rod 40b. By doing so, the pallet 11 is moved again towards the downstream side due to the friction between the circulating free flow belts 21 and the pallet 11, and the pallet 11 is collected at the downstream side end portions of the free flow belts 21 together with the workpiece that has been processed by the machine tool 2.

In a case in which the pallet 11 is also stopped at the standby point on the upstream side of the processing point, at the same time as the stopped state is released by the fluid pressure cylinder 40 that is provided at the processing point, the stopped state is also released by the fluid pressure cylinder 40 that is provided at the standby point. By doing so, the pallet 11 that is stopped at the standby point is moved to the processing point, and the fluid pressure cylinder 40 that is provided at the processing point is extended to stop further conveying of the pallet 11, and thereby, the processing by the machine tool 2 is started promptly.

The characteristic of this embodiment is that the circulating speed of the conveying belts 26 is different from the circulating speed of the free flow belts 21. Specifically, by setting the circulating speed of the conveying belts 26 to be higher than the circulating speed of the free flow belts 21, a conveying speed of the pallet 11 conveyed by the conveying belts 26 is made higher than the conveying speed of the pallet 11 conveyed by the free flow belts 21.

In this embodiment, because the driving mechanisms 30 include the first motors 31 that respectively circulate the free flow belts 21 and the second motor 36 that circulates the conveying belts 26, by controlling the first and second motors 31 and 36 so as to be driven at different rotation speeds by instruction signals from a controller (not shown), it is possible to easily increase the circulating speed of the conveying belts 26.

With the pallet conveying device 10 according to this embodiment that is provided so as to link the machine tools 1 and 2, which respectively perform predetermined processing to the workpiece, and that conveys the pallet 11 together with the workpiece, the conveying of the pallet 11 carrying the workpiece is stopped by the stopper mechanisms 40 when the pallet 11 comes to face the plurality of machine tools 1 and 2, and thereby, the machine tools 1 and 2 are each allowed to perform the processing to the workpiece.

In the above, the pallets 11 each carrying the workpiece are mounted on and conveyed by the free flow belts 21 in succession. The circulating speed of the free flow belts 21 is required to be set to an extent such that the workpiece does not jump up, move around, or jump out from the pallet 11 when the pallet 11 is stopped. Therefore, there is a limit to increase the conveying speed of the pallet 11 by increasing the circulating speed of the free flow belts 21.

However, in this embodiment, in which the circulating speed of the conveying belts 26 is set higher than the circulating speed of the free flow belts 21 opposing to the machine tools 1 and 2, intervals between the plurality of pallets 11 mounted on the free flow belts 21 in succession are increased when the pallets 11 are transferred to the conveying belts 26. As described above, in the pallet conveying device 10, the intervals between the pallets 11 mounted on the circulating belts 20 are not constant all the time.

In other words, the pallet 11 carrying the workpiece that has been subjected to the processing by the machine tool 1 on the upstream side is mounted on the free flow belts 21 and conveyed towards the downstream side, and then, the pallet 11 is transferred from the downstream side end portions of the free flow belts 21 to the conveying belts 26. By increasing the conveying speed of the pallet 11 by the conveying belts 26 so as to be higher than the conveying speed of the pallet 11 by the free flow belts 21, the interval with the succeeding pallet 11 mounted on the free flow belts 21 is increased considerably.

Then, the pallet 11 is further transferred from the downstream side end portions of the conveying belts 26 to the downstream side free flow belts 21 with a lower conveying speed, and the pallet 11 comes to face the machine tool 2 on the downstream side that is provided corresponding to the downstream side free flow belts 21.

Therefore, the time required to convey the pallet 11 on the conveying belts 26 that are provided so as to bridge over the upstream side free flow belts 21 and the downstream side free flow belts 21 is shortened, and thus, it is possible to promptly convey the pallet 11 carrying the workpiece, which has been subjected to the processing by the machine tool 1 on the upstream side, to the processing point for the machine tool 2 on the downstream side. Thus, it is possible to reduce the number of the pallets 11 required when the plurality of workpieces are to be processed successively. In addition, it is also possible to make a time interval between the processing performed by the machine tool 1 and the following processing performed by the machine tool 2 shorter relative to that for conventional devices in which the pallets 11 are conveyed at constant intervals.

Especially, as shown in enlarged views in FIGS. 10 and 12, for the pallet 11 mounted on the conveying belts 26, the engaged-protrusions and engaged-recesses 14a and 14b that are formed on the contact members 14 engage with the engaging-protrusions and engaging-recesses 26a and 26b that are formed on the conveying belts 26, and the movement of the pallet 11 in the X axis direction independent of the conveying belts 26 is prohibited, and therefore, even if the circulating speed of the conveying belts 26 is increased considerably, it is possible to reliably convey the pallet 11 at the equal speed.

In addition, in this embodiment, because the retaining members 18 that prevent the pallet 11 mounted on the conveying belts 26 from floating from the conveying belts 26 are provided, the engaged state between the conveying belts 26 and the pallet 11 is maintained reliably. Therefore, even if the conveying belts 26 are circulated at a high speed, the displacement of the pallet 11 relative to the conveying belts 26 is prevented. As a result, even if the circulating speed of the conveying belts 26 is increased considerably, it becomes possible to reliably convey the pallet 11 at a high speed.

As described above, because the conveying speed of the conveying belts 26 can be increased, for example, even in a layout in which a distance between the machine tools 1 and 2 is relatively long, it is possible to convey the pallets 11 promptly.

In a case in which time periods required for the respective processing performed by the plurality of machine tools 1 and 2 are substantially the same each other, the pallet 11 carrying the workpiece, which has been subjected to the processing by the machine tool 1 on the upstream side, may be conveyed to the standby point in the vicinity of the machine tool 2 on the downstream side with a time period that is equal to the time period required for performing the processing by stopping the conveying of the pallets 11 so as to face the machine tools 1 and 2. By doing so, only a single pallet 11 is required between the machine tools 1 and 2, and so, it is possible to considerably reduce the number of pallets 11.

According to the above-described embodiment, operational advantages described below can be afforded.

With the pallet conveying device 10 and the pallet conveying method according to this embodiment, the circulating speed of the conveying belts 26 is set to be different from the circulating speed of the free flow belts 21, and the conveying speed of the pallet 11 conveyed by the conveying belts 26 is increased so as to be higher than the conveying speed of the pallet 11 conveyed by the free flow belts 21, and thereby, it is possible to increase the interval between the pallet 11 that has been transferred from the free flow belts 21 to the conveying belts 26 and the succeeding pallet 11 remaining on the free flow belts 21.

Thus, by transferring the pallet 11 carrying the workpiece that has been subjected to the processing by the machine tool 1 on the upstream side from the free flow belts 21 to the conveying belts 26, it becomes possible to promptly convey the pallet 11 to the processing point for the machine tool 2 on the downstream side. As a result, it is possible to reduce the number of pallets 11 required to successively perform the processing on the plurality of workpieces. In addition, compared with the conventional device in which the pallets are conveyed at the constant intervals, it is possible to shorten the time period between a processing performed by a certain machine tool and a processing performed by a following machine tool.

In addition, because the engaging-protrusions and engaging-recesses 26a and 26b are formed on the conveying belts 26 and the pallet 11 is formed with the engaged-protrusions and engaged-recesses 14a and 14b, which can engage with the engaging-protrusions and engaging-recesses 26a and 26b, the movement of the pallet 11 independent of the conveying belts 26 is prohibited, and even if the circulating speed of the conveying belts 26 is increased, it is possible to reliably convey the pallet 11 at the speed equal to that of the conveying belts 26.

In the following, modifications of the above-mentioned embodiment will be described.

In the above-mentioned embodiment, a description has been given of the configuration in which the contact members 14 are provided on both side portions of the lower part of the base mount 12, and the contact members 14 are respectively brought into contact with the circulating belts 20 (the free flow belts 21 and the conveying belts 26). However, as long as the pallet 11 may slide with respect to the circulating belts 20, the base mount 12 may be brought into direct contact with the circulating belts 20 without providing the contact members 14.

In addition, in the above-mentioned embodiment, a description has been given of a case in which the fluid pressure cylinder is used as the stopper mechanism 40. However, it is only an example, and as long as the conveying of the pallets 11 can be stopped regardless of the circulation of the free flow belts 21, other actuators, such as a servomotor, etc., may also be employed as the stopper mechanisms 40.

In addition, cushioning means for softly stopping the pallet 11 may be provided on the stopper mechanism 40 such that the workpiece does not jump up or jump out from the pallet 11 when the pallet 11 is stopped by the stopper mechanism 40.

Furthermore, in the above-mentioned embodiment, a description has been given of the pallet conveying device 10 that links the two machine tools 1 and 2 having the configuration in which the upstream side free flow belts 21, the conveying belts 26 that are provided continuously to the free flow belts 21, and the downstream side free flow belts 21 that are provided continuously to the conveying belts 26 are provided. However, the pallet conveying device 10 may link three or more machine tools. As described above, even if the number of processing steps is increased due to the increase in the number of machine tools, by providing a plurality of sets of the free flow belts 21 respectively opposing to the machine tools such that the set of the conveying belts 26 is interposed between the sets of the free flow belts 21, it is possible to achieve the object of the present invention to reduce the required number of pallets by changing the intervals between the pallets carrying the workpiece.

Embodiments of this invention were described above, but the above embodiments are merely examples of applications of this invention, and the technical scope of this invention is not limited to the specific constitutions of the above embodiments.

This application claims priority based on Japanese Patent Application No. 2021-121264 filed with the Japan Patent Office on Jul. 26, 2021, the entire contents of which are incorporated into this specification.

The invention claimed is:

1. A pallet conveying device comprising:
    a circulating belt provided to extend along a conveying path so as to be capable of being circulated, the circulating belt being configured to convey a pallet;
    a driving mechanism configured to circulate the circulating belt; and
    a stopper mechanism configured to stop conveying of the pallet regardless of the circulation of the circulating belt, wherein
    the circulating belt has a free flow belt capable of stopping the conveying of the pallet by the stopper mechanism; and a conveying belt provided continuously to the free flow belt, and
    a circulating speed of the conveying belt is different from a circulating speed of the free flow belt.

2. The pallet conveying device according to claim 1, wherein
    a plurality of the free flow belts are provided such that the conveying belt is interposed between the free flow belts.

3. The pallet conveying device according to claim 1, wherein
    the stopper mechanism is provided so as to correspond to each of a processing point at which the conveying of the pallet is stopped and a standby point at which the pallet is temporarily stopped in a vicinity of the processing point.

4. The pallet conveying device according to claim 1, wherein
    the driving mechanism has a first motor configured to circulate the free flow belt and a second motor configured to circulate the conveying belt.

5. The pallet conveying device according to claim 1, wherein
    the conveying belt is formed with engaging-protrusions and engaging-recesses so as to extend in a width direction, the engaging-protrusions and engaging-recesses being formed alternately in a longitudinal direction in a continuous manner, and the pallet is formed with engaged-protrusions and engaged-recesses capable of engaging with the engaging-protrusions and engaging-recesses of the conveying belt.

6. The pallet conveying device according to claim 5, further comprising
a retaining member configured to prevent the pallet conveyed by the conveying belt from floating from the conveying belt.

7. A pallet conveying method for conveying the pallet by using the pallet conveying device according to claim 1, the pallet conveying method comprising
a step of increasing a conveying speed of the pallet conveyed by the conveying belt so as to be higher than a conveying speed of the pallet conveyed by the free flow belt by increasing a circulating speed of the conveying belt so as to be higher than a circulating speed of the free flow belt.

8. The pallet conveying method according to claim 7, wherein
the pallet is conveyed by engaging engaging-protrusions and engaging-recesses formed on the conveying belt so as to extend in a width direction with engaged-protrusions and engaged-recesses formed on the pallet, the engaging-protrusions and engaging-recesses being formed alternately in a longitudinal direction in a continuous manner.

* * * * *